United States Patent [19]
Numata

[11] Patent Number: 6,097,398
[45] Date of Patent: Aug. 1, 2000

[54] APPARATUS FOR CONVERTING COLOR SIGNALS

[75] Inventor: Kohji Numata, Tokyo, Japan

[73] Assignee: NEC Corporation, Tokyo, Japan

[21] Appl. No.: 08/309,508

[22] Filed: Sep. 22, 1994

[30] Foreign Application Priority Data

Nov. 15, 1993 [JP] Japan .................................... 5-307130

[51] Int. Cl.⁷ .................................................. G06T 5/00
[52] U.S. Cl. ........................................................ 345/431
[58] Field of Search ............................. 395/131; 345/431, 345/153, 154

[56] References Cited

U.S. PATENT DOCUMENTS 5,060,060  10/1991  Udagawa et al. ....................... 358/520
5,126,857   6/1992  Watanabe et al. .
5,130,786   7/1992  Murata et al. ........................... 348/391

FOREIGN PATENT DOCUMENTS 0240971  10/1987  European Pat. Off. .
2123245   1/1984  United Kingdom .

OTHER PUBLICATIONS

Milton S. Kiver et al., "Television Electronics", Theory and Servicing, 77 (8th ed. 1983).

R. W. McColl and G. R. Martin, "Compression of colour image data . . . clustering techniques", *Electronics & Communication Engineering Journal*, Mar./Apr. 1989, pp. 93–100.

Patent Abstracts of Japan, vol. 9, No. 234 (E–344), Sep. 20, 1985 (corresponding to JPA 60–087595).

Kulkarni et al., "On Computing . . . Digital Video", Tencon '89: Information Technologies for the 90's—E2C2; Energy, Electronics, Computers, Communications, Nov. 22, 1989, pp. 678–681.

Patent Abstracts of Japan, vol. 12, No. 54 (E–583), Feb. 18, 1988 (corresponding to JPA 62–200889).

*Primary Examiner*—Mark K. Zimmerman
*Attorney, Agent, or Firm*—Sughrue, Mion, Zinn, Macpeak & Seas, PLLC

[57] ABSTRACT

An apparatus which converts R, G, B color signals into Y, Cr, Cb signals and reconverts them into R, G, B signals, compensates converted Y signals in order to confine each component of R, G, B color signals to be reconverted in a dynamic range allowable for them.

It is not necessary to provide time consuming processes for checking and compensating reconverted R, G, B color signals and total time required for reconversion is reduced.

3 Claims, 6 Drawing Sheets

APPARATUS FOR CONVERTING COLOR SIGNALS

BACKGROUND OF THE INVENTION

This invention relates to an apparatus for converting and reconverting color signals between two different color spaces, and more particularly to an apparatus where reconverted color signals are confined in their allowed dynamic ranges when, for example, R, G, B color signals are converted into corresponding Y, Cr, Cb color signals, subjected to data compression and data decompression, and reconverted into R, G, B color signals.

FIG. 1 shows a block diagram of an embodiment of this invention, which will be used for describing a prior art.

CPU 1 converts color signals according to the program stored beforehand in control ROM 2 using control RAM 3 as a working memory. Color signals in R, G, B color space are input and stored temporarily in control RAM 3 and converted into corresponding signals in Y, Cr, Cb color space by the conversion program. Converted color signals are registered in a filing device 4 after compressed by a picture data compressor 5. Picture data to be displayed on a display 8 are read out from the filing device 4, decompressed by a picture data decompressor 6 and are reconverted into corresponding color signals in R, G, B color space by the reconversion program. The reconverted R, B, G color signals are stored in a frame buffer memory 7 to be displayed on the display 8.

Conversion of color signals in R, G, B color space into corresponding signals in Y, Cr, Cb color space or reconversion vice versa should be completed in a high speed.

As prior arts developed for this purpose, there are Japanese patents laid open as preliminary patent publication No. 210771/'84 (hereafter called the first prior art) and No. 288684/'92 (hereafter called the second prior art).

As for conversion and reconversion of color signals between R, G, B color space and Y, Cr, Cb color space, following formula (1) and formula (2) are applied.

$$\begin{vmatrix} Y \\ Cr \\ Cb \end{vmatrix} = \begin{vmatrix} 0.2963 & 0.5926 & 0.1111 \\ 0.7037 & -0.5926 & -0.1111 \\ -0.2963 & -0.5926 & 0.8889 \end{vmatrix} \begin{vmatrix} R \\ G \\ B \end{vmatrix} \quad (1)$$

$$\begin{vmatrix} R \\ G \\ B \end{vmatrix} = \begin{vmatrix} 1 & 1 & 0 \\ 1 & -0.5000 & -0.1875 \\ 1 & 0 & 1 \end{vmatrix} \begin{vmatrix} Y \\ Cr \\ Cb \end{vmatrix} \quad (2)$$

It takes, however, a lot of time to convert and reconvert color signals by calculating these formulas.

To eliminate these calculations, conversion tables are used as shown in FIG. 7. In FIG. 7, 1a, 1b, and 1c are input terminals of R, G and B signal, 4a, 4b, and 4c are output terminals of Y, Cr, and Cb signal, and 3a, 3b and 3c are corresponding conversion tables, for example.

Conversion or reconversion tables as shown in FIG. 7, however, need a lot of memory.

When R, G, B, Y, Cr and Cb signals have digital values of 8 bits, for example, table 3a has addresses of 24 bits ($2^{24}$) and data in each address needs 8 bits and so total amount of memory for table 3a, 3b and 3c require 402653184 bits.

The first and the second prior arts are developed for economizing memory volume.

In the first prior art, the number of addresses of 3a, 3b and 3c is reduced as far as possible. Formula (1) shows that G has the greatest effect on Y and that the effect of G on Y is ½ and that of B is smaller than ¼ of the effect of G on Y. So, when the number of addresses provided for G is 8 bits, the number of addresses provided for R can be reduced to upper 7 bits and the number of addresses provided for B to upper 6 bits with little decrease of accuracy. In the first prior art, the memory volume for conversion tables is thus economized.

In the second prior art, output data are obtained by calculating from intermediate data that are read out from intermediate conversion tables provided instead of full conversion tables, thus economizing the memory volume for tables.

Figure 8:
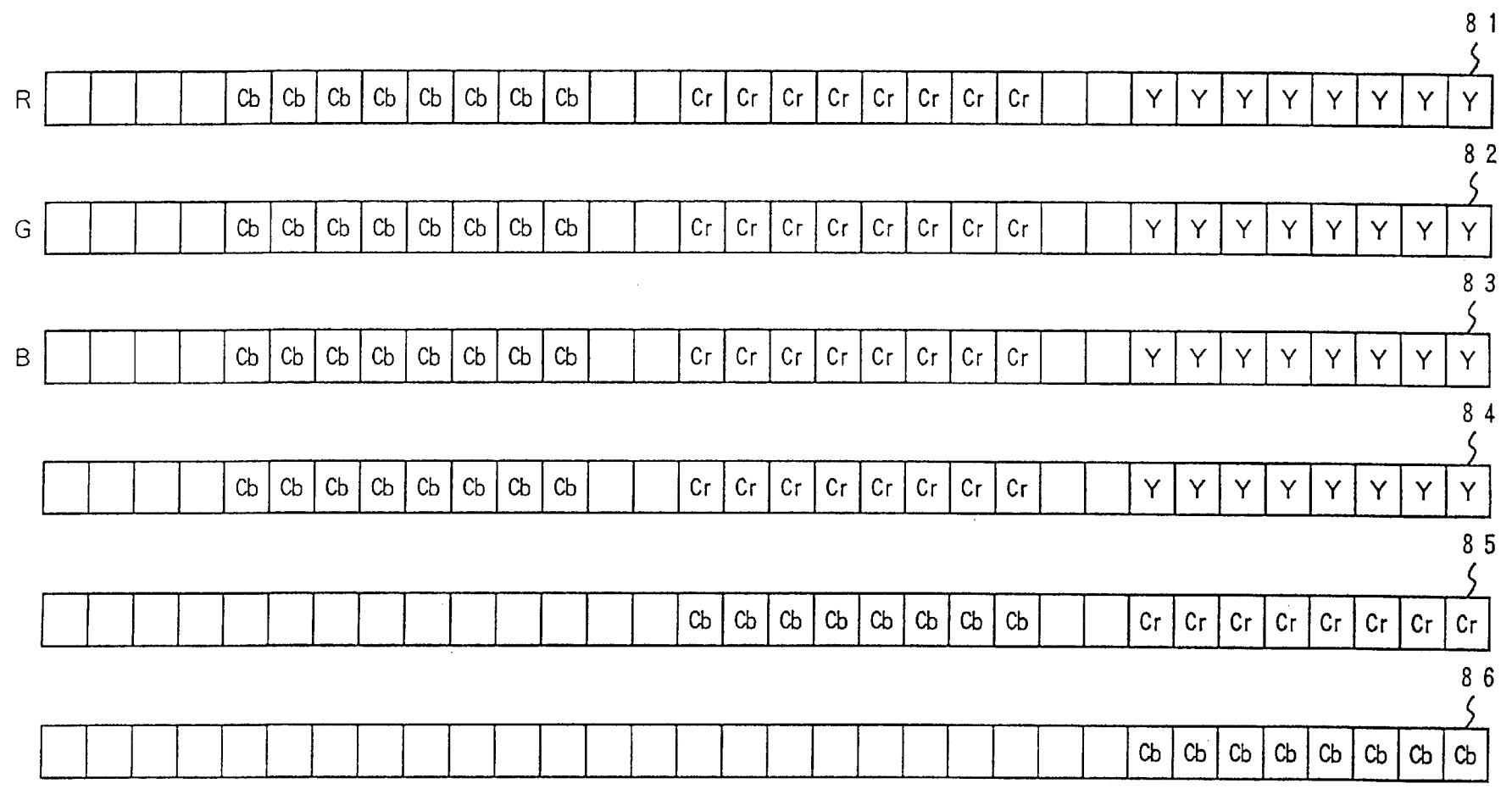

FIG. 8 illustrates data format read out from the intermediate conversion tables in the second prior art.

Table 3a in FIG. 7, for example, has addresses of 24 bits corresponding to the value of R, G and B, and outputs 8 bits data of Y=0.2963R+0.5926G+0.1111B that is registered in each address and has the value calculated according to the formula (1).

In FIG. 8, data 81 is read out from an intermediate conversion table provided for R where data of Y=0.2963R, Cr=0.7037R and Cb=−0.2963R is registered in each 8 bits address corresponding to the value of R. Data area is composed of a word of 32 bits and 30 of which are used and assigned for Y, Cb and Cr each by 10 bits.

Similarly, data 82 of Y=0.5926G, Cr=−0.5926G, Cb=−0.5926G and data 83 of Y=0.1111B, Cr=−0.1111B and Cb=0.8889B are read out respectively from other conversion table. Data 84 that is obtained by adding data 82 and 83 to data 81 gives the output values of Y, Cr and Cb corresponding to the input value of R, G and B. Lower 10 bits of the data 84 gives the value of Y. The values of Cr and Cb are obtained from data 85 and data 86 that is obtained from data 84 by shifting right by 10 bits and 20 bits, respectively.

The first and the second prior arts are developed for economizing the memory volume of conversion tables and to reduce conversion and reconversion time.

However, in a heretofore known apparatus, including the first and the second prior arts, there remains another time consuming process.

FIG. 4 shows a flow chart illustrating reconversion process in a heretofore known apparatus and S401–S407 show steps of detailed processes.

At step S401, compressed data of Y, Cr, Cb in the filing device 4 are read out, decompressed at S402 and reconverted into R,G,B signals at S403. Values of R, G, B signals after reconversion may differ from those of original R, G, B signals and may go beyond their allowed dynamic ranges because fractions may be rounded off in the operations of conversion, reconversion, compression, decompression or in other processes. So, the values of signals after reconversion have to be checked and revised.

At step S404, the values of R, G, B signals after reconversion are checked if they go beyond their allowed dynamic range and the values which are out of ranges are replaced with the nearest values within their allowed dynamic ranges at step S405.

As signals developed in the frame buffer at step S407 are displayed directly on display 8, particularly the reconversion process as shown in FIG. 4 should be completed in a short time. However, the reconversion process in a heretofore known apparatus must be provided with time consuming steps S404 and S405.

SUMMARY OF THE INVENTION

Therefore, an important object of this invention is to eliminate these time consuming steps from the reconversion process of an apparatus for converting and reconverting color signals.

In order to achieve this object, values of Y, Cr, Cb signals converted from R, G, B signals are checked and compensated in this invention so that the values of R, G, B signals reconverted from Y, Cr, Cb signals are confined in their allowable dynamic ranges.

And in the compensation process for this purpose, it is sufficient to compensate only the value of Y signal leaving the values of Cr and Cb as they are, because Y signal has a largest effect on all of R, G and B signals as formula (2) shows.

When the dynamic ranges allowable for the values of R, G, B signals are all 0–255, for example, formula (2) shows that the value of Y must be in the range from Y=−Cr=YRL to YRL+255 for R signal to be in the range from 0 to 255, from Y=−Cb=YBL to YBL +255 for G signal and from Y=0.5Cr+0.1875Cb=YGL to YGL+255 for B signal.

So, in order that all R, G, B signals have values within their dynamic ranges, it is sufficient to compensate the value of Y signal to the nearest value within the common range of the above mentioned three ranges.

Furthermore, reconversion tables may be omitted in this invention for reducing total memory volume required.

BRIEF DESCRIPTION OF THE DRAWINGS

Further objects, features and advantages of this invention will become apparent from a consideration of the following description, appended claims and the accompanying drawings in which the same numerals indicate the same or the corresponding parts.

FIG. 8 shows some examples of the data format of a second prior art.

DETAILED DESCRIPTION OF THE PREFERRED EMBODIMENTS

Figure 1:
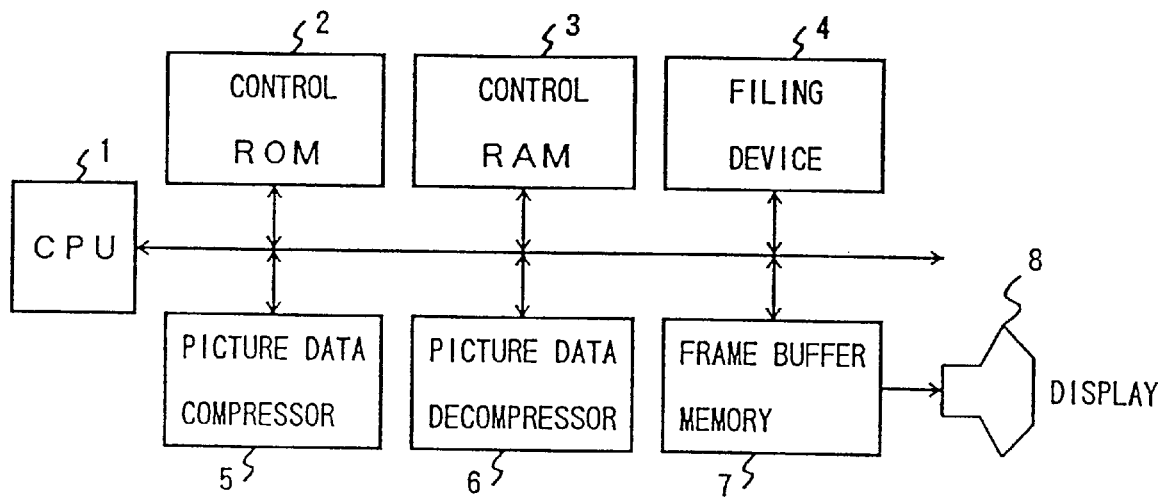
FIG. 1 shows a block diagram of an embodiment of this invention.
Figure 2:
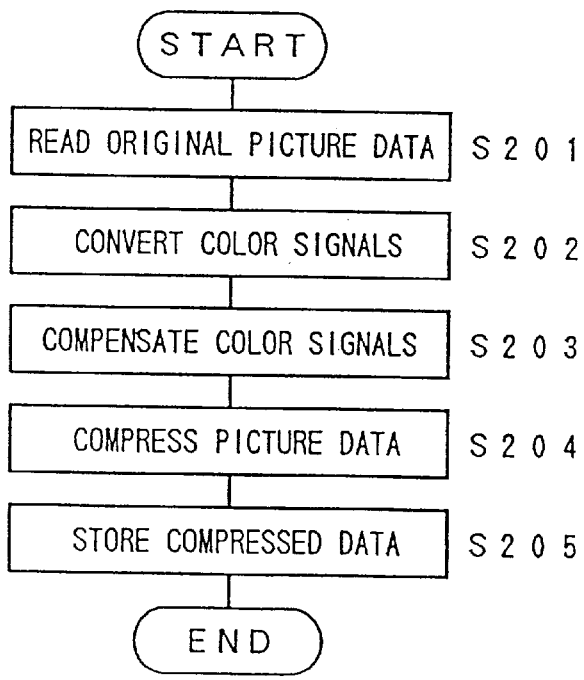
FIG. 2 shows a flow chart illustrating the color converting process of this invention.
Figure 3:
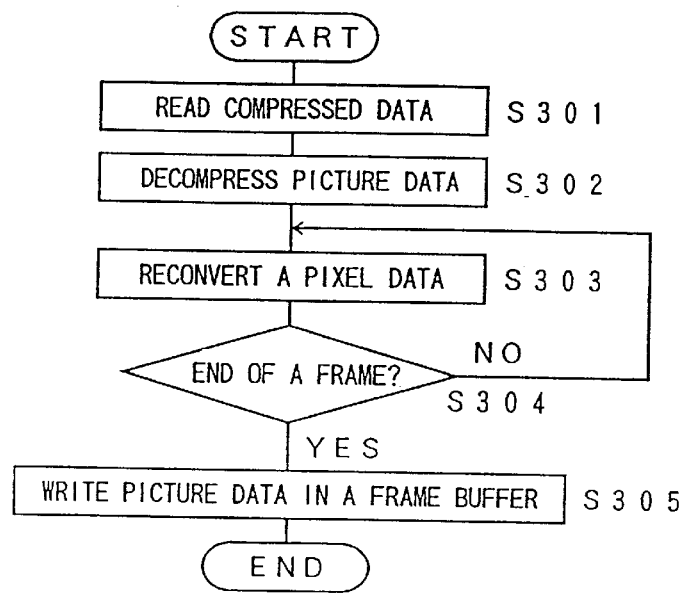
FIG. 3 shows a flow chart illustrating the color reconverting process of this invention.

Referring to FIG. 1, FIG. 2 and FIG. 3, an embodiment of this invention is described. Each process performed by the apparatus of FIG. 1 is already mentioned in connection with heretofore known apparatus. Steps S201–S207 in FIG. 2 and steps S301–S305 in FIG. 3 shows steps of detailed processes of the conversion and reconversion processes of this invention.

In the step S201, original picture data composed of R, G, B color signals are read out from an original picture file and stored in the main memory provided in the control RAM 3.

Conversion process is performed at step S202 and signals after conversion are compensated at step S203. At step S204, compensated signals are compressed by the picture data compressor 5 and then the compressed data are stored in the filing device 4 at step S205.

Figure 4:
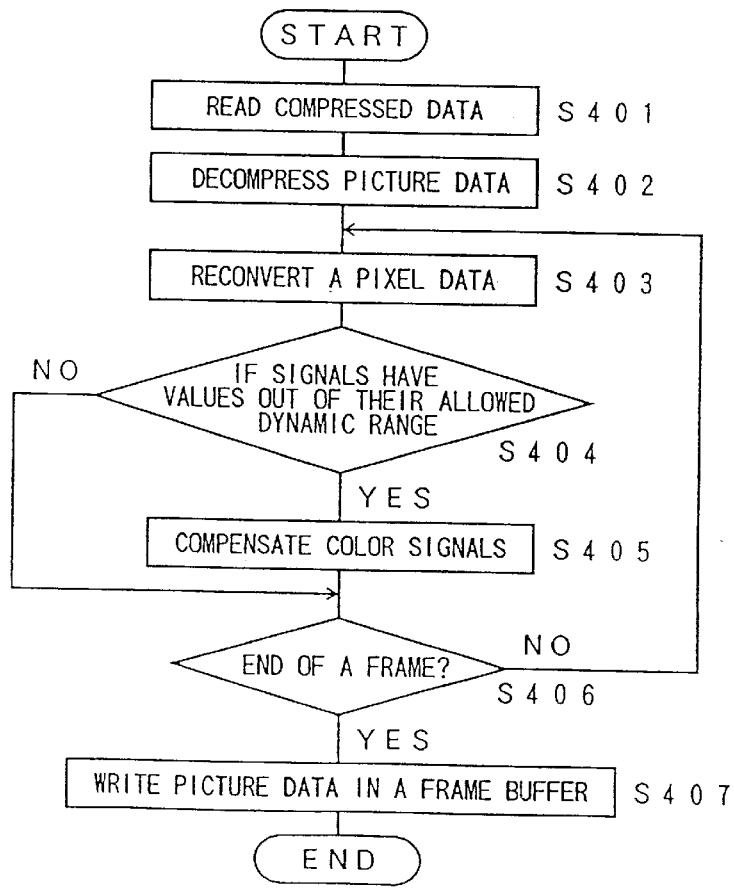
FIG. 4 shows a flow chart illustrating a color reconverting process of a heretofore known apparatus.

As for steps S301–S305 in FIG. 3, they correspond to the steps S401–S403 and S406–S407 of FIG. 4, which have been described in a foregoing paragraph.

In FIG. 2 and 3, the step S203 of the compensation process is the only step characterized in this invention.

Now, this compensation process will be described in connection with FIG. 5 and FIG. 6 when the allowable dynamic ranges for R, G, B signals are all 0–255.

When R, G, B color signals are converted into Y, Cr, Cb signals, it is practical to compensate only the value of Y signal leaving the values of Cr and Cb as they are.

Formula (2) means R=Y+Cr, B=Y−Cb and G=Y−Cr/2−3Cb/16 (3/16=0.1875). So, when the values of Y in case R=0, G=0 and B=0 are defined as YRL, YBL and YGL respectively, YRL=−Cr, YBL=Cb and YGL=Cr/2+3Cb/16.

And YRH, YGH and YBH, the values of Y in case R=255, G=255 and B=255, are YRL+255, YGL+255 and YBL+255 respectively.

When the value of Y is in the range from Ylow to Yhi, all the values of R, G, B reconverted from Y, Cr, Cb color signals are in the range from 0 to 255, where Ylow is the maximum value of YRL, YGL and YBL and Yhi is the minimum value of YRH, YGH and YBH.

Figure 5:
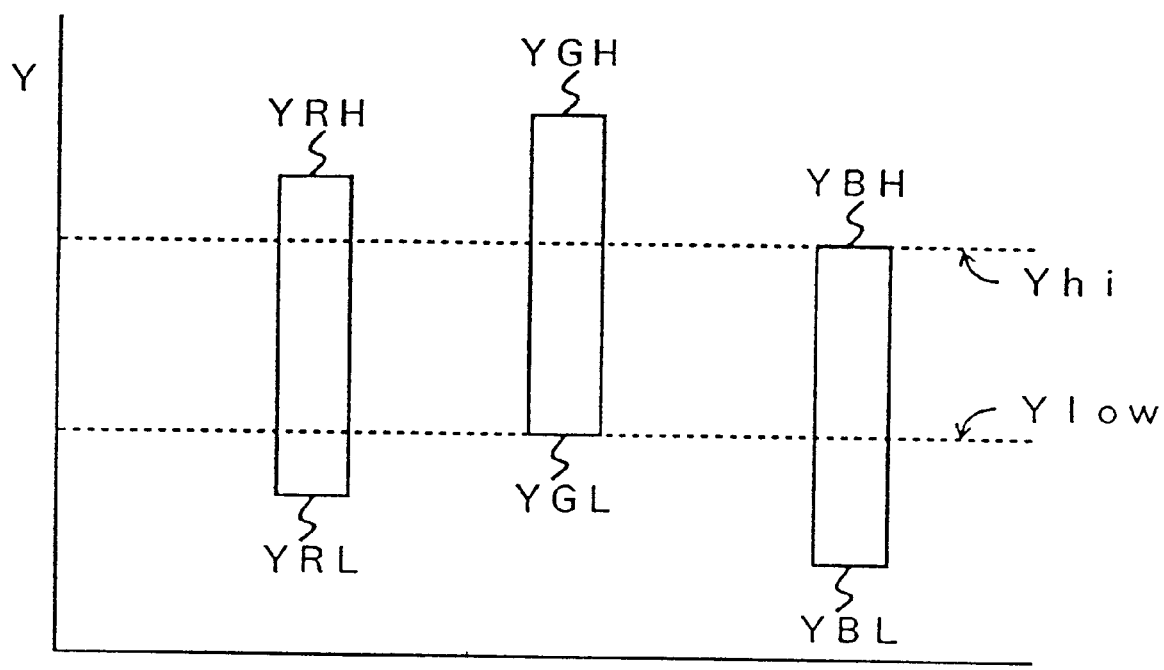
FIG. 5 shows a bar chart illustrating the range allowed for the value of Y signals in this invention.

FIG. 5 shows a bar chart illustrating the relation between these values.

Figure 6:
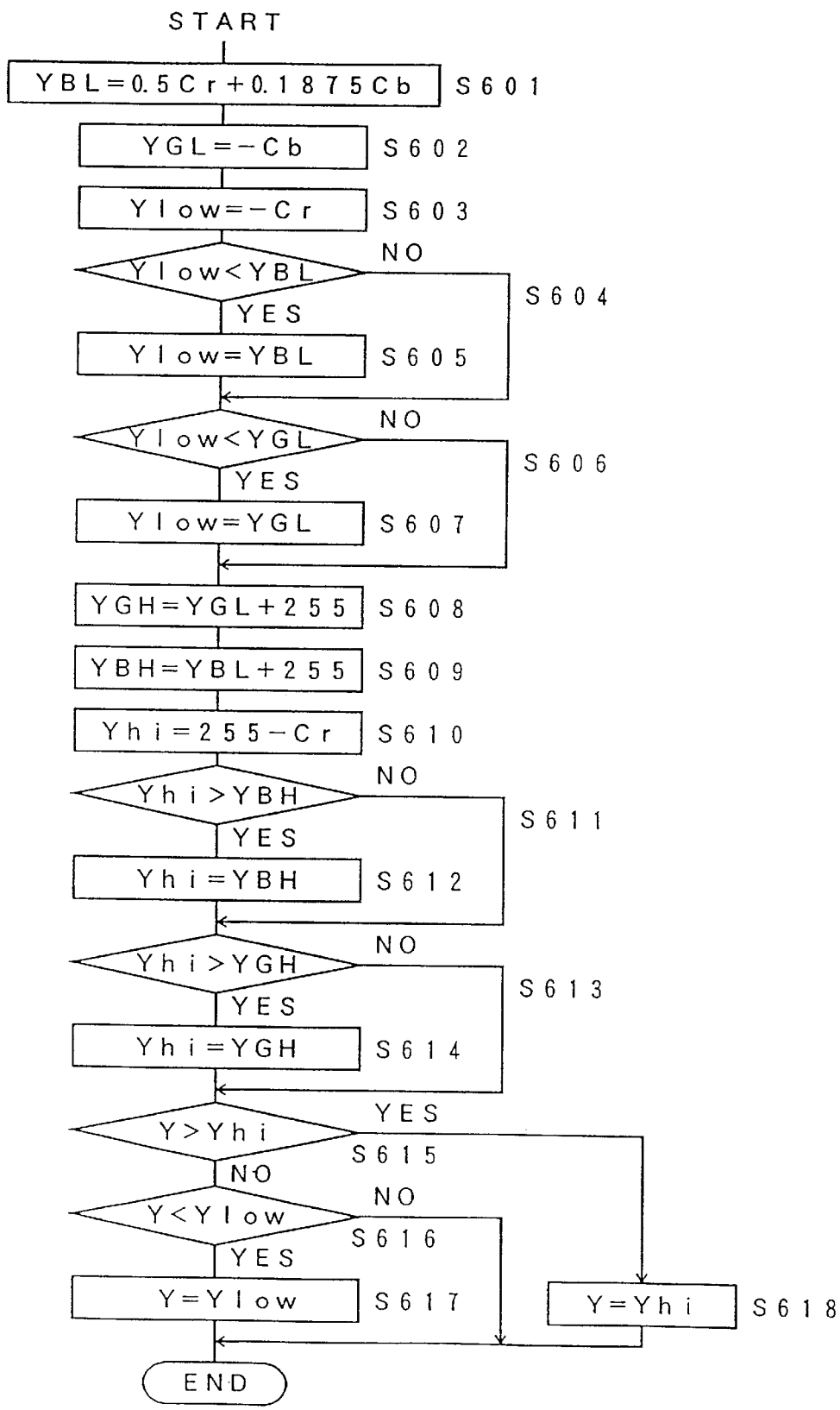
FIG. 6 shows a flow chart illustrating program steps performed in the compensation process of FIG. 2.
Figure 7:
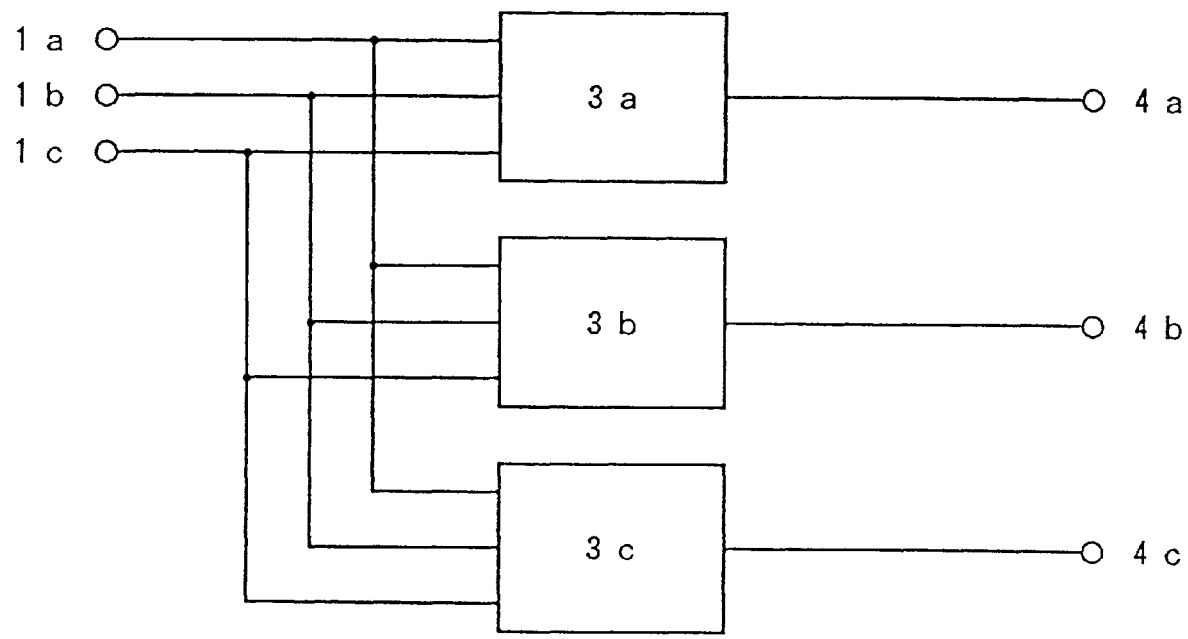
FIG. 7 shows a block diagram of conversion or reconversion tables of a heretofore known apparatus.

S601–S618 in FIG. 6 are program steps performed in the compensation process S203 in FIG. 2.

The values of Ylow and Yhi in FIG. 5 are obtained at program steps from S601 to S614 as described in connection with FIG. 5. Here, in FIG. 6, YGL is first substituted for Ylow at step S603 and then Ylow is compared with YGL and YBL and replaced with adequate value at steps from S604 to S607. Similarly, the value of Yhi is determined at steps from S610 to S614.

Y signal to be compensated is verified at step S615 and S616 and, in case Y>Yhi or Y<Ylow, it is replaced with Yhi or Ylow at step S618 or S617 respectively.

The value of Y signal being thus compensated previously, it is not necessary to check and compensate color signals after reconversion of a picture data at step S303 in FIG. 3.

The color conversion at step S202 of FIG. 2 and the reconversion of a picture data at step S303 of FIG. 3 are to be processed either by calculating operation according to the formulas or by using conversion tables.

In the present invention, as it is not necessary to provide time consuming processes as steps S404 and S405 in FIG. 4, the reconversion of a picture data at step S303 is to be processed by calculating operation, economizing the memory volume for conversion tables.

Although the embodiment of this invention is described in case when R, G, B color signals are converted into corresponding Y, Cr, Cb signals and reconverted into R, G, B color signals and when the dynamic ranges allowed for values of R, G, B signals are all 0–255, it is apparent that the application of this invention is not to be limited in this case.

It is apparent that this invention is applicable when color signals in any color space are converted into corresponding color signals in another color space and reconverted into those of original color space.

What is claimed is:

1. An apparatus for converting color signals comprising;
   means for converting R, G, B color signals into Y, Cr, Cb color signals in accordance with relations represented by $$\begin{vmatrix} Y \\ Cr \\ Cb \end{vmatrix} = \begin{vmatrix} 0.2963 & 0.5926 & 0.1111 \\ 0.7037 & -0.5926 & -0.1111 \\ -0.2963 & -0.5926 & 0.8889 \end{vmatrix} \begin{vmatrix} R \\ G \\ B \end{vmatrix},$$

means for subjecting converted Y, Cr, Cb color signals to data compression, means for subjecting compressed Y, Cr, Cb color signals to data decompression which is a reverse process of said data compression, means for reconverting decompressed Y, Cr, Cb color signals into R, G, B color signals in accordance with relations represented by $$\begin{vmatrix} R \\ G \\ B \end{vmatrix} = \begin{vmatrix} 1 & 1 & 0 \\ 1 & -0.5000 & -0.1875 \\ 1 & 0 & 1 \end{vmatrix} \begin{vmatrix} Y \\ Cr \\ Cb \end{vmatrix}, \text{ and}$$

means for compensating at least one of converted Y, Cr, Cb color signals in order to confine each component of reconverted R, G, B color signals in a dynamic range allowable for said component.

2. An apparatus for converting color signals comprising;

means for converting R, G, B color signals into Y, Cr, Cb color signals in accordance with relations represented by $$\begin{vmatrix} Y \\ Cr \\ Cb \end{vmatrix} = \begin{vmatrix} 0.2963 & 0.5926 & 0.1111 \\ 0.7037 & -0.5926 & -0.1111 \\ -0.2963 & -0.5926 & 0.8889 \end{vmatrix} \begin{vmatrix} R \\ G \\ B \end{vmatrix},$$

means for subjecting converted Y, Cr, Cb color signals to data compression, means for subjecting compressed Y, Cr, Cb color signals to data decompression which is a reverse process of said data compression, means for reconverting decompressed Y, Cr, Cb color signals into R, G, B color signals in accordance with relations represented by $$\begin{vmatrix} R \\ G \\ B \end{vmatrix} = \begin{vmatrix} 1 & 1 & 0 \\ 1 & -0.5000 & -0.1875 \\ 1 & 0 & 1 \end{vmatrix} \begin{vmatrix} Y \\ Cr \\ Cb \end{vmatrix}, \text{ and}$$

means for compensating Y component of converted Y, Cr, Cb color signals in order to confine each component of reconverted R, G, B signals in a dynamic range of $0-(2^8-1)$.

3. An apparatus for converting color signals of claim 2, wherein said means for compensating comprises;

means for calculating three values of Y in accordance with equations

YGL=0.5Cr+0.1875Cb,

YBL=-Cb,

YRL=-Cr, means for determining lower limit of Y by a highest value of YBL, YGL, YRL, means for calculating other three values of Y in accordance with equations

YGH=YGL+255,

YBH=YBL+255,

YRH=YRL+255, means for determining upper limit of Y by a lowest value of YBH, YGH, YRH, and means for substituting said lower limit of Y for values of Y smaller than said lower limit and substituting said upper limit of Y for values of Y larger than said upper limit.

* * * * *